United States Patent
Sitaram et al.

(10) Patent No.: US 9,301,208 B1
(45) Date of Patent: Mar. 29, 2016

(54) MANAGING OPTIMAL RELATION NEIGHBOR DATA

(71) Applicant: Sprint Communications Company L.P., Overland Park, KS (US)

(72) Inventors: Krishna Datt Sitaram, Chantilly, VA (US); Daniel Alberto Vivanco, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 339 days.

(21) Appl. No.: 13/895,521

(22) Filed: May 16, 2013

(51) Int. Cl.
*H04W 36/00* (2009.01)

(52) U.S. Cl.
CPC ...... *H04W 36/0016* (2013.01); *H04W 36/0022* (2013.01); *H04W 36/0061* (2013.01); *H04W 36/0066* (2013.01); *H04W 36/0083* (2013.01)

(58) Field of Classification Search
None
See application file for complete search history.

(56) References Cited

U.S. PATENT DOCUMENTS

| | | | |
|---|---|---|---|
| 2012/0178451 A1* | 7/2012 | Kubota et al. | 455/436 |
| 2012/0182969 A1* | 7/2012 | Takahashi et al. | 370/331 |
| 2013/0150056 A1* | 6/2013 | Yi et al. | 455/444 |
| 2014/0010207 A1* | 1/2014 | Horn et al. | 370/332 |

* cited by examiner

*Primary Examiner* — Ashley Shivers

(57) ABSTRACT

Systems, methods, and computer-readable media for managing optimal neighbor data utilizing a user device are provided. Aspects of the present invention relate to a source cell providing instructions to a user device instructing the user device to determine neighbor relation data, such as an internet protocol address, of a target cell. Additional aspects of the present invention concern a user device utilizing a neighbor relation table to determine neighbor relation data, such as an internet protocol address, of a target cell.

19 Claims, 6 Drawing Sheets

MANAGING OPTIMAL RELATION NEIGHBOR DATA

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter.

In brief, and at a high level, this disclosure describes, among other things, performing a method of managing optimal neighbor relation data utilizing a user device. In embodiments, when a source cell determines that a portion of specific neighbor relation data is unknown about a target cell, the source cell provides instructions to the user device instructing the user device to gather specific neighbor relation data. Additionally, in embodiments of the present invention, a user device may determine the specific neighbor relation data by decoding a broadcast message from a target cell and utilizing a mapping between a first set of neighbor relation data to a second set of neighbor relation data. The specific neighbor relation data may be provided to the source cell. Utilizing the specific neighbor relation data, the source cell may execute a handover between the source cell and the target cell.

BRIEF DESCRIPTION OF THE SEVERAL VIEWS OF THE DRAWINGS

The present invention is illustrated by way of example and not limitation in the accompanying figures in which like references numerals indicate similar elements and in which.

DETAILED DESCRIPTION

Figure 1:
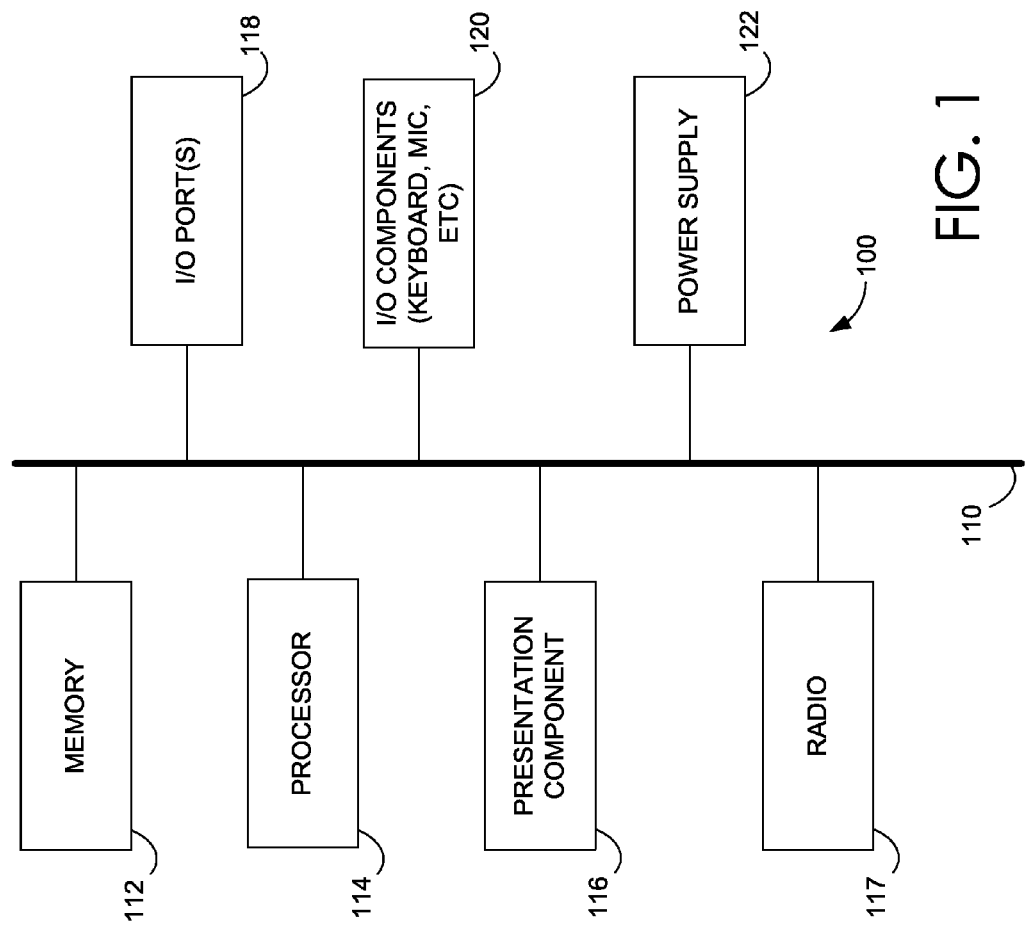
FIG. 1 depicts an illustrative device suitable for use in connection with embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Aspects of the present invention provide systems, computer-readable media and methods for gathering and determining neighbor relations data. Neighbor relations data may include, among other things, an evolved universal radio access cell global identifier (ECGI), a physical cell identifier (PCI), and an internet protocol (IP) address of various cells within a telecommunications environment. In embodiments, neighbor relations data is used for a device to obtain and/or maintain connection with a network.

Generally a user device may obtain and maintain connection with a network by communicating with a cell of that network. The cell that a user device may connect to may depend on the physical location of the cell, the physical location of the user device, or the strength of the connection between the cell and the user device. For instance, while a user device is at physical location A, the user device may have a strong connection and be in communication with cell A. However, when the user device moves from physical location A to physical location B, the connection between the user device and cell A may become weakened due to the distance between physical location A and the user device. The user device may need to obtain a connection with a different cell, such as a cell B, in order to maintain connection with the network. Further, if the user device is being used while moving from physical location A to physical location B, maintaining connection with the network may be important in order to avoid a dropped call, for instance. A connection with cell B may be established by transferring data associated with the user device from cell A to cell B. The process of transferring an ongoing call or data session from one cell to another cell is referred to as a handover.

To perform a handover, a source cell, such as cell A, establishes communication with a target cell, such as cell B. Prior to the source cell establishing communication with the target cell, the source cell may identify the target cell by gathering information about the target cell. Information gathered about a target cell may include, but not be limited to, a PCI, an ECGI, and/or an IP address. Generally, a PCI and/or ECGI may be used to determine an IP address of a target cell. Once the IP address of a target cell is determined, the source cell may establish a connection with the target cell and transfer data associated with the user device from the source cell to the target cell.

Aspects of the present invention relate to gathering information necessary to establish a communication between a source cell and a target cell. Accordingly, an embodiment of the present invention relates to computer storage media having computer-executable instructions embodied thereon that, when executed, perform a method for instructing a user device to gather an IP address of a target cell. The method includes determining that an ECGI of a target cell cannot be identified based on a received PCI. The method further includes communicating instructions to a user device instructing the user device to determine an IP address of the target cell and receiving the IP address of the target cell from the user device.

Another embodiment of the present invention relates to computer storage media having computer-executable instructions embodied thereon that, when executed, perform a method for gathering an IP address of a target cell. The method includes determining a first ECGI of a target cell based on a first broadcast message of the target cell and comparing the determined first ECGI to a Neighbor Relation Table (NRT), wherein the NRT comprises a mapping of a plurality of ECGIs to a plurality of IP addresses. The method further includes determining that the first ECGI does not correspond to at least one IP address of the plurality of IP addresses and communicating a request to the target cell requesting a second broadcast message to be communicated from the target cell.

In yet another embodiment, the present invention is directed towards a system for executing a handover utilizing a user device. The system includes the user device that comprises a processor coupled to a computer-storage medium, the computer-storage medium having stored thereon a plurality of computer software components executable by the processor. The computer software components of the user device include a first determining component for determining a first ECGI based on a first broadcast message from a target cell. The software components of the user device further include a second determining component for determining whether the determined first ECGI corresponds to at least one IP address of a plurality of IP addresses by comparing the first ECGI to a NRT, wherein the NRT comprises a mapping of a plurality of ECGIs to the plurality of IP addresses, such that when the first ECGI corresponds to the at least one IP address of the plurality of IP addresses, communicating the at least one IP address of the plurality of IP addresses to a source cell, or when the first ECGI does not correspond to the at least one IP address of the plurality of IP addresses, communicating a request to the target cell requesting a second broadcast message from the target cell.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Telephone Technology |
| 4G | Fourth-Generation Wireless Telephone Technology |
| ANR | Automatic Neighbor Relations |
| CDMA | Code Division Multiple Access |
| CD-ROM | Compact Disk Read Only Memory |
| CRM | Customer Relations Management |
| DNS | Domestic Network Server |
| DVD | Digital Versatile Discs |
| ECGI | Evolved Universal Radio Access Cell Global Identifier |
| EEPROM | Electrically Erasable Programmable Read Only Memory |
| ENODEB | Evolved Node B |
| GPRS | General Packet Radio Service |
| GPS | Global Positioning System |
| GSM | Global System for Mobile Communications |
| iDEN | Integrated Digital Enhanced Network |
| IP | Internet Protocol |
| LTE | Long Term Evolution |
| MME | Mobility Manage Equipment |
| MSC | Mobile Serving Center |
| MMS | Multimedia Messaging Service |
| NRT | Neighbor Relations Table |
| PC | Personal Computer |
| PCI | Physical Cell Identifier |
| PCS | Personal Communications Service |
| PDA | Personal Digital Assistant |
| PLMN | Public Land Mobile Network |
| RAM | Random Access Memory |
| RF | Radio Frequency |
| ROM | Read Only Memory |
| SLA | Service Level Agreement |
| SMS | Short Message Service |
| SON | Self-Organizing Network |
| TDMA | Time Division Multiple Access |
| UMTS | Universal Mobile Telecommunications Systems |
| VoIP | Voice over IP |
| Wi-Fi | Wireless Fidelity |
| WiMAX | Worldwide Interoperability for Microwave Access |

Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, further elaboration will not be provided here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Aspects of the present invention relate to efficiently gathering neighbor relation data utilizing a user device such that a successful handover may be executed. Neighbor relation data may include, but is not limited to, a PCI, a Cell Global Identifier (CGI), an ECGI, and an IP address. A PCI is an identifier of a cell that is unique within a local network and/or geographic area. More than one cell within a network and/or global area may have the same PCI. A CGI and an ECGI are identifiers of a cell that are each unique to that cell within a network and globally. An IP address is an internet protocol address that is assigned to a cell. In instances, an IP address may be unique to the cell within a network and/or geographic area. In order to execute a successful handover, a source cell may need to have an IP address of a target cell. Generally, a source cell may comprise a NRT, where the NRT includes neighbor relation data. Additionally, an NRT may comprise a mapping between a plurality of PCIs, a plurality of ECGIs, and a plurality of IP addresses such that if a PCI is known, an ECGI and IP address may be determined. In certain network environments, an automatic neighbor relation (ANR) function resides within the source cell and manages the NRT. Located within an ANR, a Neighbor Detection Function (NDF) may find new neighboring cells and add the new neighboring cells to the NRT. In such instances, when a user device connects with a specific neighboring cell (i.e. a target cell), the source cell may utilize the NRT in order to obtain the neighbor relation data necessary to establish the connection with the neighboring cell.

A general process of obtaining neighbor relation data such that a handover may be executed involves a source cell obtaining a PCI of a target cell from a user device. If the PCI is unknown by the source cell, the source cell may instruct the user device to obtain the ECGI of the target cell. A PCI may be determined as unknown by the source cell if the PCI is not located within an NRT at the source cell. In order to obtain the ECGI of the target cell, the user device may decode a broadcast message of the target cell. Upon decoding the broadcast message of the target cell and determining an ECGI, the user device may send the ECGI to the source cell. The source cell may utilize the ECGI to determine an IP address of the target cell that corresponds to the ECGI provided by the user device. Generally, a broadcast message may be a message designed for simultaneous delivery to multiple users in a specified area.

In some instances of a general handover process the user device may incorrectly decode the ECGI of the target cell and provide an incorrect ECGI of the target cell to the source cell preventing a corresponding IP address of the target cell from being located. In such instances, an element management system may estimate the PCI value corresponding to the closest neighboring cell to the source cell. This may result in determining an ECGI and/or IP address of the closest neighboring cell and executing a handover with the closest neighboring cell. However, the closest neighboring cell may not be able to establish a strong connection or a connection at all with the user device. For instance, the closest neighboring cell of the source cell may be farther away from the user device than the source cell. The distance between the closest neighboring cell may be too far for the user device to establish a connection with the closest neighboring cell. In such instances, the ongoing phone call and/or data session of the user device may be transferred to the closest neighboring cell and because the user device may be unable to establish a connection with the closest neighboring cell, the user device may lose connection with the network. A loss of connection with the network may include the ongoing phone call being dropped and/or data session being ended.

Additionally, in some instances of a general handover process where the user device may incorrectly decode the ECGI of the target cell and provide an incorrect ECGI of the target cell to the source cell, the source cell may fail to obtain an IP address of any cell. In such instances, the source cell may not transfer an ongoing phone call or data session to any cell. A user device may eventually lose connection with the source cell, and without the transfer of the ongoing phone call or data session, the user device may lose connection with the network, resulting in a dropped phone call and/or an ending of a data session.

In aspects of the present invention, when a source cell is unable to recognize a PCI, the source cell may provide instructions to a user device instructing the user device to determine an IP address of a target cell. In additional aspects of the present invention, the user device may determine an IP address of a target cell and provide the IP address to a source cell. As will be described further below, there are a variety of benefits associated with a user device determining an IP address of a target cell. One key benefit is decreased loss of a user device connection with a network due to an incorrect ECGI being provided to a source cell.

In embodiments of the present invention, a source cell provides instructions to a user device instructing the user device to determine an IP address of a target cell. In some embodiments, the source cell provides instructions to the user device instructing the user device to determine an IP address of the target cell after receiving a PCI of a target cell from a user device and determining that the PCI is not known by the source cell. A source cell may determine that a PCI is not known by consulting an NRT located at the source cell. An NRT may comprise a mapping between a plurality of PCIs to a plurality of ECGIs. Additionally, an NRT may comprise a mapping between a plurality of ECGIs to a plurality of IP addresses. A PCI may be determined as unknown by the source cell when the PCI is not located in an NRT at the source cell. In some embodiments, a source cell provides instructions to a user device instructing the user device to determine an IP address of a target cell when a corresponding ECGI may not be determined based on the PCI. For instance, an NRT may comprise a listing of a PCI without a listing of an ECGI that corresponds to the PCI. Additionally, in some instances, a source cell may provide instructions to a user device to determine the IP address of the target cell when a corresponding ECGI to the PCI provided by the user device is not known and/or located in the NRT located at the source cell.

Figure 2:
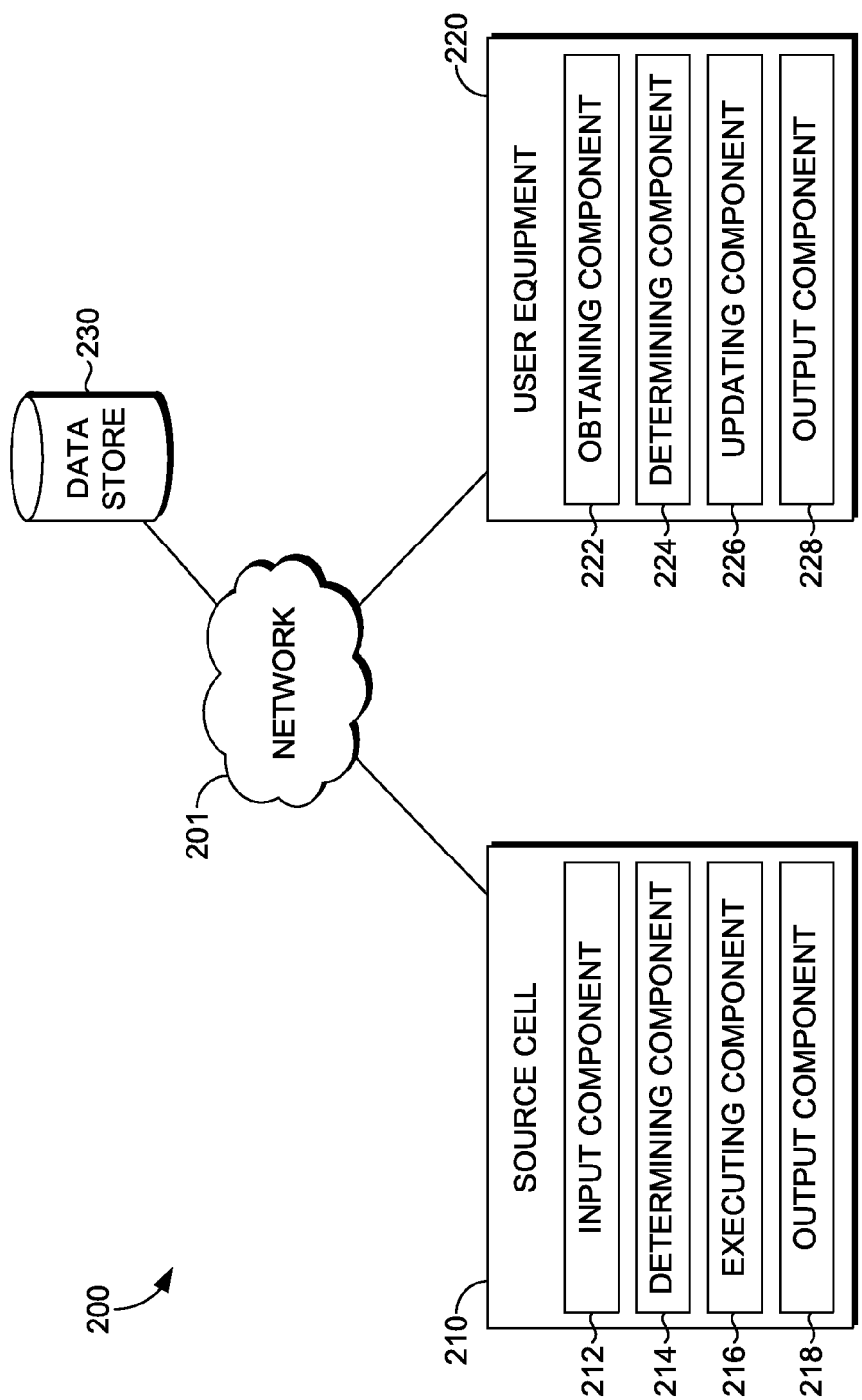
FIG. 2 is a schematic view of an exemplary network environment suitable for performing embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated. In embodiments, the network environment 200 includes a network 201, a source cell 210, a user device 220, and data store 230.

In the network environment 200, user device 220 may communicate with other devices, such as mobile devices, servers, etc. User device 220 may take on a variety of forms, such as a personal computer (PC), a laptop computer, a tablet, a netbook, a mobile phone, a smartphone, a personal digital assistant (PDA), or any other device that is capable of communicating with other devices. In embodiments, a user device comprises a wireless or mobile device with which telecommunication network(s) can be utilized for communication (e.g., voice and/or data communication). In this regard, the user device can be any mobile computing device that communicates by way of, for example, 3G or 4G network.

The user device 220 can utilize network 201 to communicate with other computing devices (e.g., a mobile device(s), a server(s), a personal computer(s) etc.). In embodiments, network 201 is a telecommunications network(s), or a portion thereof. A telecommunications network might include an array of devices or components (e.g., a base station), some of which are not shown so as to not obscure more relevant aspects of the invention. Components such as terminals, links, and nodes (as well as other components) can provide connectivity in some embodiments. Network 201 can include multiple networks, as well as being a network of networks, but is shown in more simple form so as to not obscure other aspects of the present invention. Network 201 can be a part of a telecommunications network that connects subscribers to their immediate service provider. In embodiments, network 201 can be associated with a telecommunications provider that provides services (e.g., LTE) to user devices, such as user device 220. For example, network 201 may provide voice services to user devices or corresponding users that are registered or subscribed to utilize the services (e.g., LTE) provided by a telecommunications provider. Network 201 can be any communication network providing voice and/or data services(s), such as, for example, a 1× circuit, a 3G network (e.g., CDMA, CDMA2000, WCDMA, GSM, UMTS), or a 4G network (WiMAX, LTE, HSDPA).

Data store 230 is configured to store data associated with neighbor relation data. Specifically, data store 230 may include PCIs, ECGIs, CGIs, IP addresses and other cell identifying information of a plurality of cells. Data store 230 may be located within components of network 201, source cell 210, and/or user device 220.

In embodiments, source cell 210 includes an input component 212, a determining component 214, an executing component 216, and an output component 218. Additionally, source cell 210 may include a data store (not shown). Input component 212 of source cell 210 may be configured to, among other things, receive neighbor relation data. Typically input component 212 receives neighbor relation data, among other data, from user device 220. However, input component 212 may receive neighbor relation data and/or other data from any cell (not shown) or any component of network 201.

Determining component 214 of source cell 210 may be configured to, among other things, determine whether the neighbor relation data received at input component 212 includes information that is necessary to establish a handover between source cell 210 and a target cell (not shown). For instance, determining component 214 may receive a PCI from user device 220 and determine that the received PCI is not listed in an NRT of source cell 210 by comparing the received PCI to a list of a plurality of PCIs in the NRT and not finding a match. Upon determining component 214 failing to find a match between the received PCI and the plurality of PCIs in the NRT, determining component 214 may determine that a handover between source cell 210 and another cell may not be established using the received neighbor relation data (i.e. the received PCI) and/or the NRT.

Additionally, determining component 214 may be configured to, among other things, determine an ECGI based on the received PCI and to determine an IP address based on the ECGI. Determining component 214 may determine the ECGI and/or IP address by comparing the PCI and ECGI to a plurality of ECGIs and/or a plurality of IP addresses within an NRT. The NRT may be located in data store 230. As described above, data store 230 may be located in source cell 210, network 201 and/or user device 220.

Executing component 216 may be configured to, among other things, execute a handover between source cell 210 and a target cell (not shown) by establishing a connection between source cell 210 and the target cell and transfer data of user device 220 to the target cell. The transferred data may include, but not be limited to, an ongoing phone call and/or a data session.

Output component 218 may be configured to, among other things, communicate with the target cell in order to establish a connection between source cell 210 and the target cell and transfer data of user device 220 to the target cell. Output component 218 may also be configured to communicate with components of network 201. For instance, in embodiments where data store 230 is located in network 201, output component 218 may be configured to communicate with data store 230 within network 201 in order to obtain neighbor relation data of an NRT.

Output component 218 may also be configured to send instruction data to user device 220. Instruction data may include data instructing user device 220 to obtain an ECGI and/or IP address of a target cell and provide the ECGI and/or IP address to source cell 210. Additionally, instruction data may include an NRT that includes a mapping between a plurality of PCIs and a plurality of ECGIs and/or a mapping between a plurality of ECGIs and a plurality of IP addresses. In some embodiments, the NRT may include data that corresponds to a frequency band that the user device is currently connected to or associated with by location. By including data that corresponds to the frequency band to which the user device is associated, a search overhead may be kept small. Generally, a search overhead is the transferring of information across a functional interface between a user device and a telecommunications system or between functional units within a telecommunications system for the purpose of directing the transfer of information associated with the user device.

Turning now to user device 220, which may include obtaining component 222, determining component 224, updating component 226, and output component 228. Obtaining component 222 of user device 220 may be configured to, among other things, receive neighbor relation data, broadcast messages, and instructions. Typically, neighbor relation data may be received from a source cell and/or a target cell. Neighbor relation data may also be received from components within network 201. Typically, broadcast messages are received from a target cell. However, broadcast messages may also be received from source cell 210 or any cells within or outside of network 201. Typically, instructions are received from source cell 210. However, instructions may be received from any cell and/or components within network 201.

Determining component 224 of user device 220 may be configured to, among other things, determine an ECGI from a broadcast message. For instance, upon obtaining component 222 receiving a broadcast message from a target cell, determining component 224 may decode the broadcast message in order to determine an ECGI of the target cell. Determining component 224 may also be configured to determine an IP address from the ECGI. In embodiments, determining component 224 may compare the determined ECGI to a mapping between a plurality of ECGIs to a plurality of IP addresses in order to find a match between the determined ECGI and an IP address. Additionally, determining component 224 may be configured to compare a PCI to a mapping between a plurality of PCIs to a plurality of ECGIs in order to find a match between the PCI and an ECGI.

Updating component 226 may be configured to, among other things, update an NRT based on received and/or determined neighbor relation data by adding, removing, or altering data within an NRT. For instance, a PCI may be listed within an NRT without a corresponding ECGI. Upon determining component 224 determining an ECGI that corresponds to the PCI, the updating component 226 may add the corresponding ECGI to the NRT. In another instance, the updating component 226 may also determine an IP address that corresponds to an ECGI and update the NRT by adding the determined IP address to the NRT, removing a previously listed IP address and/or altering a previously listed IP address based on the determined IP address.

Output component 228 is configured to communicate with source cell 210, network 201, and a target cell (not shown). In communication with source cell 210 and network 201, output component 228 may send neighbor relation data to source cell 210 and/or network 201. For instance, output component 228 may send a PCI, an ECGI, an IP address, and/or an updated NRT to source cell 210, and/or network 201. In communication with the target cell, output component 228 may send a request for a broadcast message from target cell. Additionally, output component 228 may request broadcast messages from and send neighbor relation data to additional cells (not shown).

Figure 3:
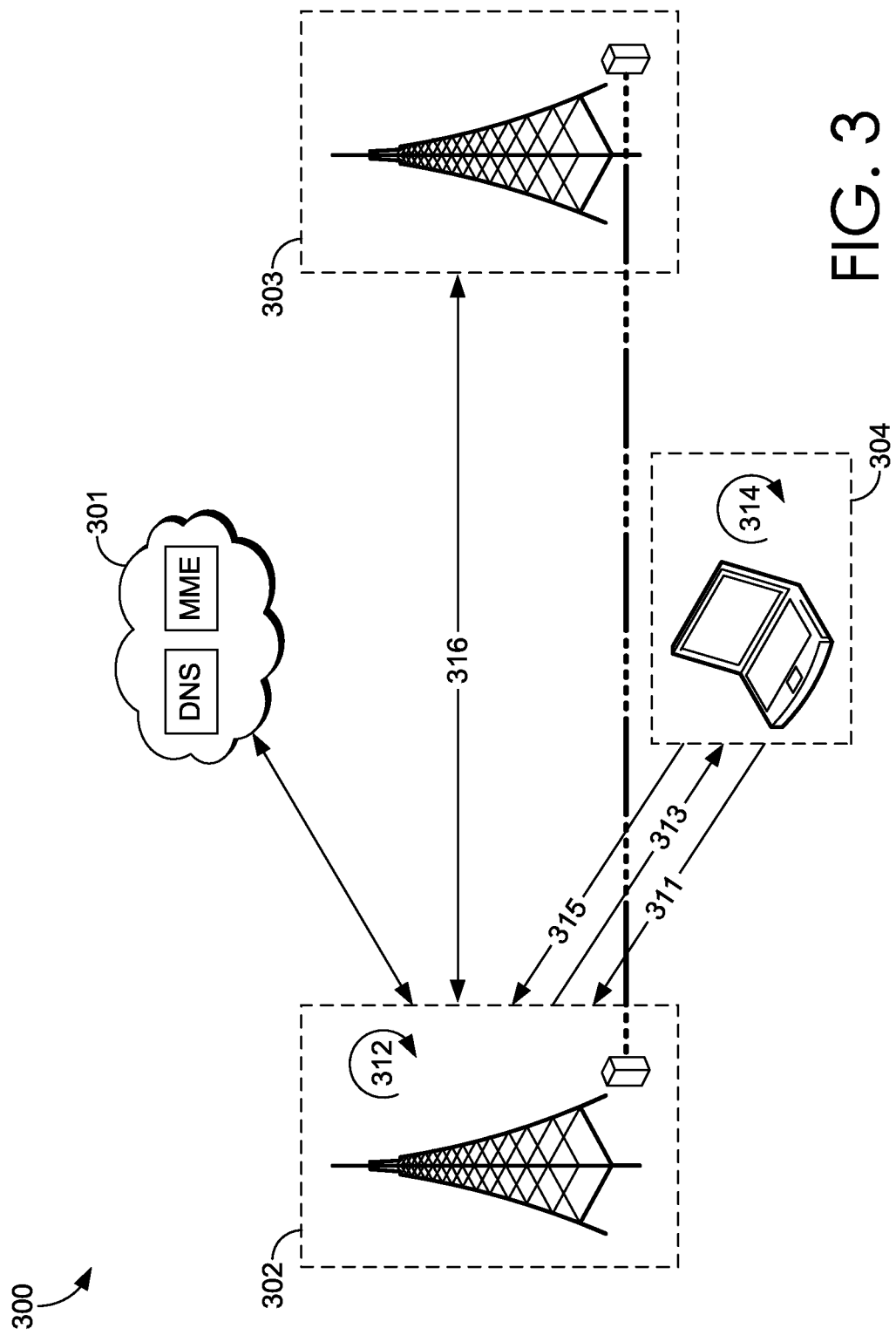
FIG. 3 is a schematic view of an exemplary network environment suitable for performing embodiments of the present invention.

Turning now to FIG. 3, an exemplary illustration of a network environment 300 that includes a network 301, a source cell 302, a target cell 303, and a user device 304. Network 301 may be similar to network 201. Network 301 may include a domestic network server (DNS) and mobility management entity (MME). For illustration purposes, arrows between source cell 302, user device 304 and target cell 303 are provided to illustrate the communication of data between each such that source cell 302 may obtain the necessary information to execute a handover between source cell 302 and target cell 303. In certain embodiments, the PCI of target cell 303 is obtained by user device 304 through a broadcast message from target cell 303. At 311, the PCI of target cell 303 is provided to source cell 302 by user device 304. At 312, source cell 302 determines that the PCI and/or an ECGI corresponding to the PCI is unknown. At 313, source cell 302 sends instructions to user device 304 instructing user device 304 to determine the ECGI and/or an IP address of target cell 303. In some embodiments, the instructions from source cell 302 may include an NRT. In other embodiments, user device 304 may receive an NRT from components of network 301, such as the DNS component. At 314, user device 304 determines the ECGI and/or IP address of target cell 303. At 315, user device 304 sends the determined ECGI and/or IP address of target cell 303 to source cell 302. At 316, using the IP address received from user device 304, source cell 302 may establish a connection with target cell 303, transfer data to target cell 303, and execute a successful handover.

Figure 4:
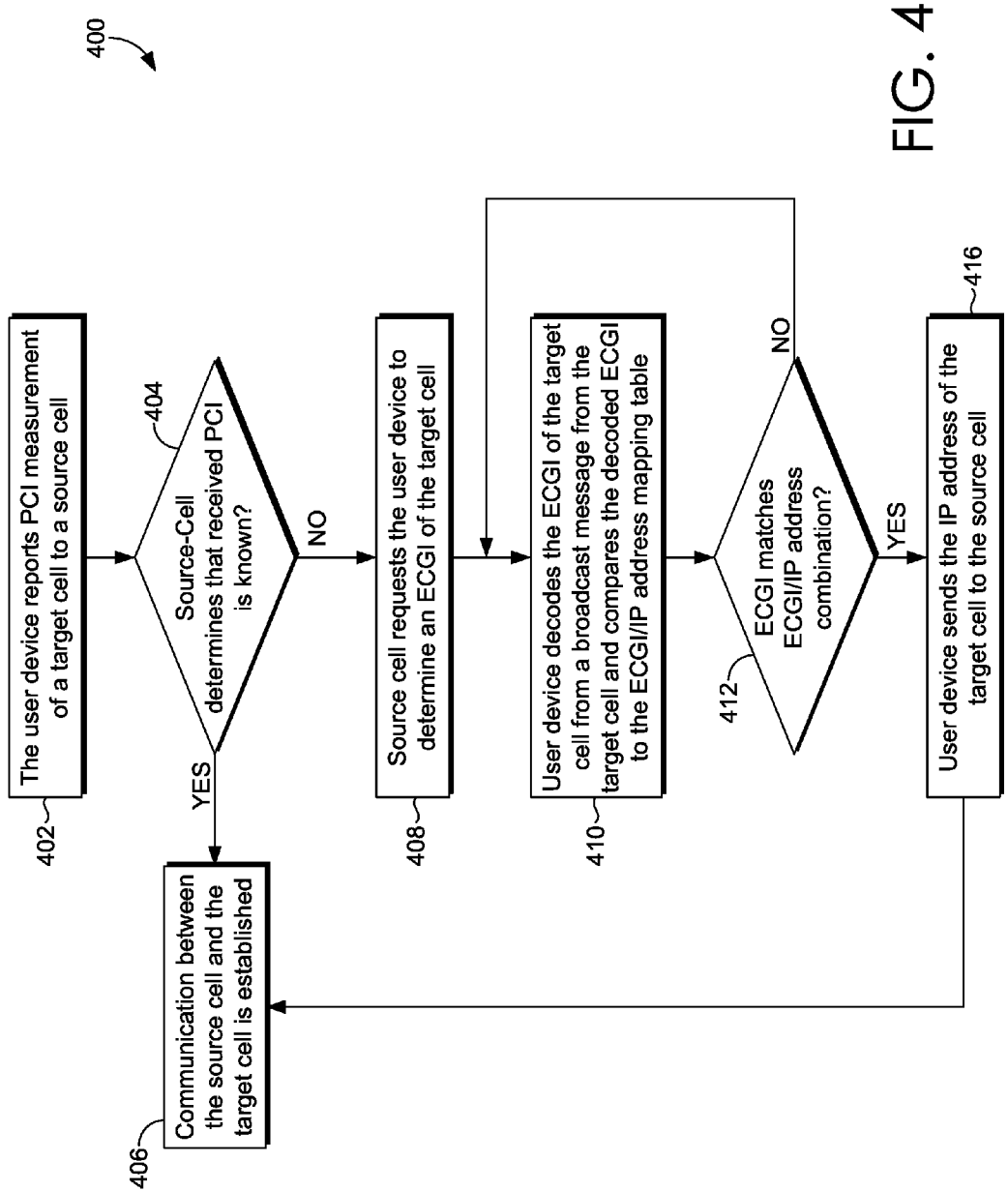
FIG. 4 is a flow diagram depicting an illustrative method for gathering neighbor relations data utilizing a user device.

FIG. 4 illustrates an exemplary method 400 of a source cell providing instructions to a user device to obtain an IP address of a target cell and a user device utilizing an NRT to obtain an IP address of the target cell. At block 402, the user device reports a PCI of a target cell to a source cell. At block 404, the source cell determines whether the received PCI is known. The determination of whether the received PCI is known may be determined utilizing an NRT. If it is determined that the received PCI is known, then a communication between the source cell and target cell is established at block 406. If it is determined that the received PCI is not known, then at block 408, the source cell requests the user device to determine an ECGI of the target cell. In addition, an ECGI/IP address mapping table may be provided to the user device. At block 410, the user device decodes an ECGI of the target cell from a broadcast message from the target cell and compares the decoded ECGI to the ECGI/IP address mapping table. In some embodiments, the ECGI is decoded by the user device reading the ECGI from the target cell broadcast control channel. At block 412, the user device determines whether the decoded ECGI matches an ECGI/IP address combination. If no match is found, then a return to block 410 is made such that the user device may decode a second ECGI of the target cell from a second broadcast message from the target cell and compare the decoded second ECGI of the target cell to the ECGI/IP address mapping table. In some embodiments, blocks 410 and 412 may be repeated until a match is determined. In other embodiments, blocks 410 and 412 may be repeated up to a threshold number of times. Upon reaching the threshold number of times, at the instruction of the source cell or without the instruction of the source cell, the user device may obtain neighbor relations data from neighboring cells and begin again at block 410 with the new neighbor relations data. At block 412, if a match is found, then the user device sends the IP address that corresponds to the decoded ECGI to the source cell such that a communication between the source cell and target cell may be established, as shown in block 406.

Figure 5:
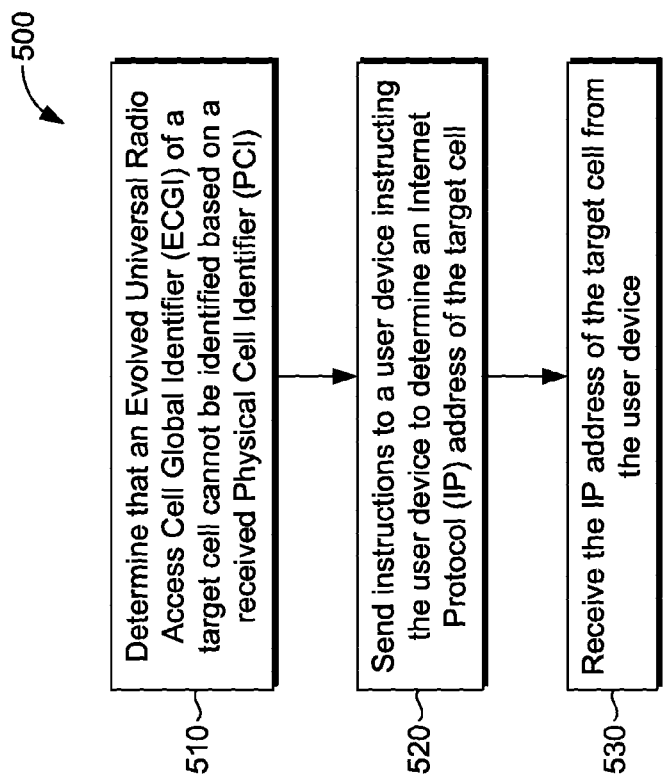
FIG. 5 is a flow diagram depicting an illustrative method for instructing a user device to determine an IP address of a target cell.

FIG. 5 illustrates a method 500 for instructing a user device to gather an IP address of a target cell. At block 510, a source cell may determine that an ECGI of a target cell cannot be identified based on the received PCI. In some instances, an ECGI of a target cell cannot be identified based on a received PCI because the received PCI is not located a NRT that maps a plurality of PCIs to a plurality of ECGIs. At block 520, instructions are sent to the user device instructing the user device to determine an IP address of the target cell. At block 530, the IP address of the target cell is received from the user device.

Figure 6:
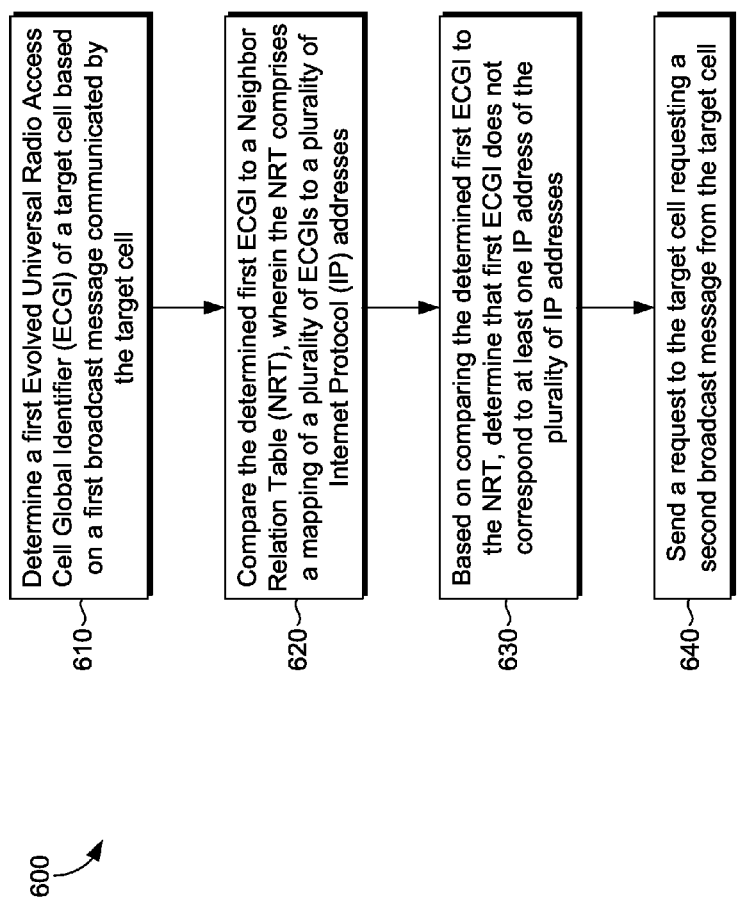
FIG. 6 is a flow diagram depicting an illustrative method for a user device determining an IP address of a target cell.

FIG. 6 illustrates a method 600 for a user device gathering an IP address of a target cell. At block 610 the first ECGI from a first broadcast message from a target cell is determined. At block 620, the determined first ECGI is compared to a NRT, wherein the NRT comprises a mapping between a plurality of ECGIs to a plurality of IP addresses. At block 630, based on the comparing of the determined first ECGI to the NRT, a determination is made that the first ECGI does not correspond to at least one IP address of the plurality of IP addresses. At block 640, a request is sent to the target cell requesting a second broadcast message from the target cell.

Many benefits are provided utilizing the present invention. Among various other benefits, the number of successful handovers may be increased and dropped connections due to missing neighbors may be decreased. Additionally, the probability of incorrect neighbor relations data provided from a user device to a source cell, such as an ECGI, may be decreased.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Non-transitory computer storage media having computer-executable instructions embodied thereon that, when executed, perform a method comprising:
at a source cell:
determining that an Evolved Universal Radio Access Cell Global Identifier (ECGI) for a target cell cannot be identified based on a received Physical Cell Identifier (PCI);
providing a Neighbor Relation Table (NRT) to a user device;
communicating a message to the user device, the message indicating an instruction for the user device to determine an Internet Protocol (IP) address for the target cell; and
receiving the IP address for the target cell from the user device.

2. The media of claim 1, wherein the method further comprises:
establishing a communication with the target cell based on the IP address.

3. The media of claim 2, wherein the method further comprises:
executing a handover between the source cell and the target cell based on the IP address.

4. The media of claim 1, wherein the PCI is received from the user device.

5. The media of claim 1, wherein the method further comprises:
updating the NRT with the IP address for the target cell.

6. The media of claim 5, wherein the method further comprises:
communicating the updated NRT to an element management system.

7. A method comprising:
determining a first Evolved Universal Radio Access Cell Global Identifier (ECGI) for a target cell based on a first broadcast message communicated by the target cell;
at a processor of a computing device, comparing the first ECGI to a Neighbor Relation Table (NRT), wherein the NRT comprises a mapping of a plurality of ECGIs to a plurality of Internet Protocol (IP) addresses;
based on comparing the first ECGI to the plurality of ECGIs included in the NRT, determining the first ECGI does not correspond to at least one IP address of the plurality of IP addresses included in the NRT; and
communicating a first message to the target cell, the first message indicating a request for the target cell to communicate a second broadcast message.

8. The method of claim 7, further comprising:
receiving the second broadcast message; and
determining a second ECGI for the target cell.

9. The method of claim 8, further comprising:
comparing the second ECGI to the plurality of ECGIs included in the NRT.

10. The method of claim 9, further comprising:
based on comparing the second ECGI to the plurality of ECGIs included in the NRT, determining whether the second ECGI corresponds to at least one IP address of the plurality of IP addresses, wherein:
when the second ECGI corresponds to the at least one IP address of the plurality of IP addresses, the computing device communicates the at least one IP address of the plurality of IP addresses to a source cell, and
when the second ECGI does not correspond to the at least one IP address of the plurality of IP addresses, the computing device communicates a second message to the target cell, the second message indicating a request for a third broadcast message from the target cell.

11. The method of claim 8, wherein the second ECGI is based on one or more of: the first ECGI, the first broadcast message, or the second broadcast message.

12. The method of claim 7, wherein the NRT is received from a source cell.

13. The method of claim 10, further comprising:
determining a Physical Cell Identifier (PCI) for the target cell based on the first broadcast message.

14. The method of claim 13, wherein the NRT further comprises a mapping among a plurality of PCIs and the plurality of ECGIs.

15. The method of claim 14, further comprising updating the NRT when the second ECGI corresponds to the at least one IP address of the plurality of IP addresses, wherein updating the NRT comprises at least one of adding, removing, or replacing values within the NRT such that the mapping among the plurality of PCIs and the plurality of ECGIs reflects an association between the PCI for the target cell and the second ECGI.

16. The method of claim 15, further comprising communicating the updated NRT to the source cell.

17. A computing system comprising:
a processor; and
computer storage memory having stored thereon computer-executable instructions that, when executed by the processor, implement a method comprising:
determining a first Evolved Universal Radio Access Cell Global Identifier (ECGI) for a target cell based on a first broadcast message from the target cell; and
comparing the first ECGI to a Neighbor Relation Table (NRT), wherein the NRT comprises a mapping of a plurality of ECGIs to a plurality of Internet Protocol (IP) addresses, in order to determine whether the first ECGI corresponds to at least one IP address of the plurality of IP addresses included in the NRT, wherein:
when the first ECGI corresponds to the at least one IP address of the plurality of IP addresses, the computing system communicates the at least one IP address of the plurality of IP addresses to a source cell, and
when the first ECGI does not correspond to the at least one IP address of the plurality of IP addresses, the computing system communicates a message to the target cell, the message indicating a request for a second broadcast message from the target cell.

18. The computing system of claim 17, wherein the source cell is configured to:
determine that the first ECGI cannot be determined based on a received Physical Cell Identifier (PCI) for the target cell;
communicate instructions to the computing system instructing the computing system to determine an IP address for the target cell, the instructions comprising the NRT; and receive the IP address for the target cell from the computing system.

19. The computing system of claim 17, wherein the method further comprises:

updating the NRT, wherein the NRT comprises a mapping of a plurality of PCIs to the plurality of ECGIs, and wherein updating the NRT comprises at least one of adding, removing, or replacing values in the NRT based on the first ECGI, the at least one IP address of the plurality of IP addresses, and at least one PCI for the target cell.

* * * * *